United States Patent Office 2,995,279
Patented Aug. 8, 1961

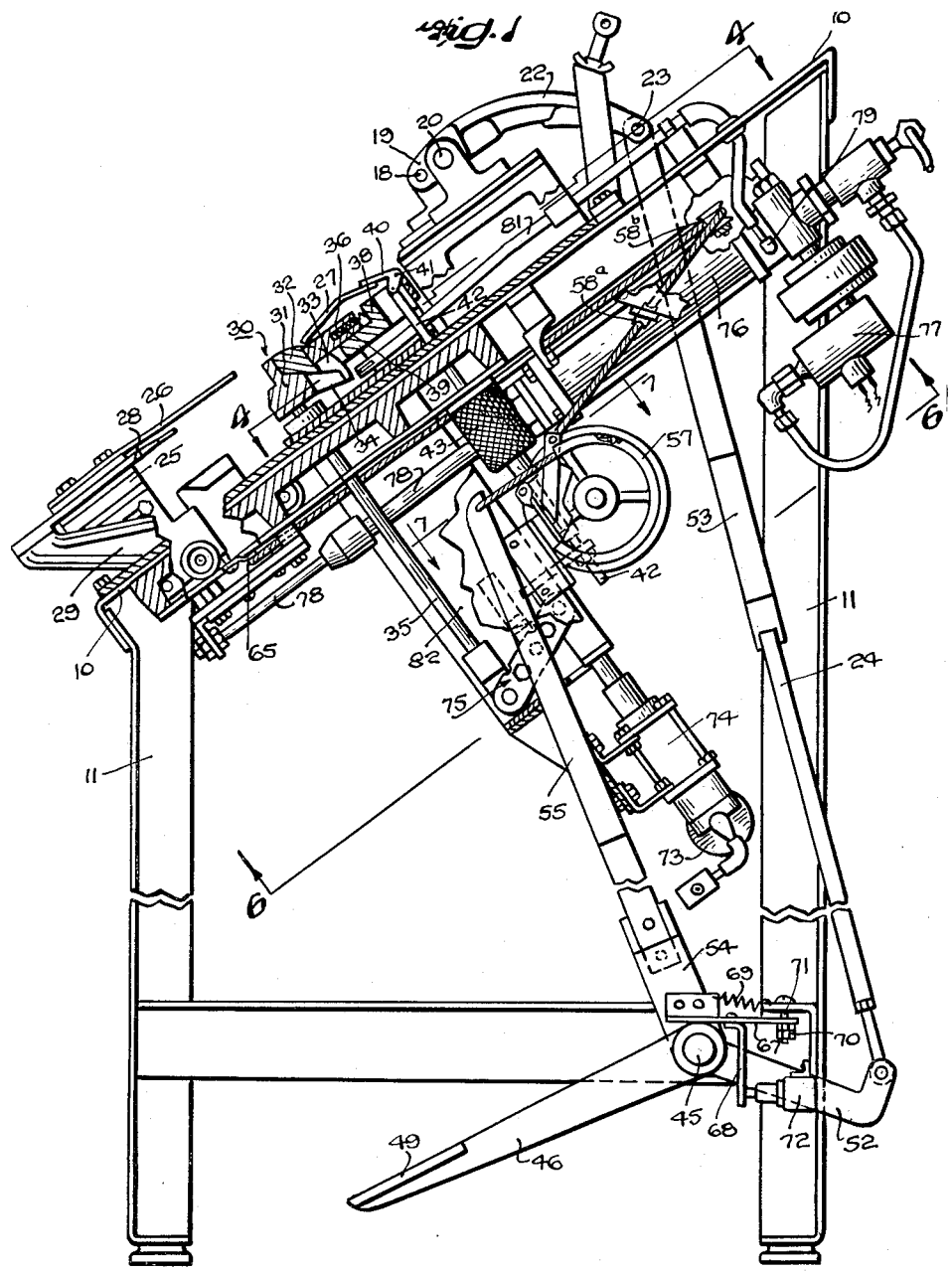

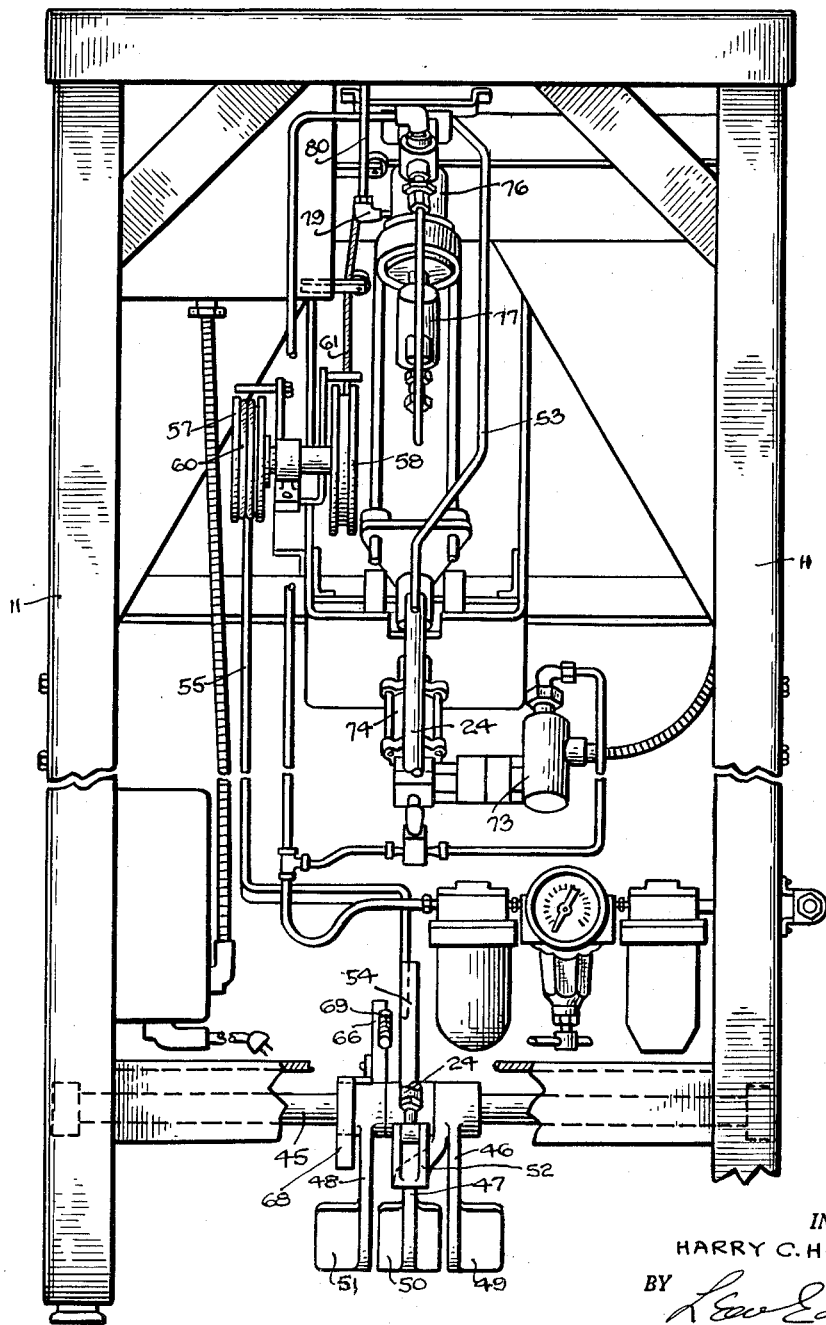

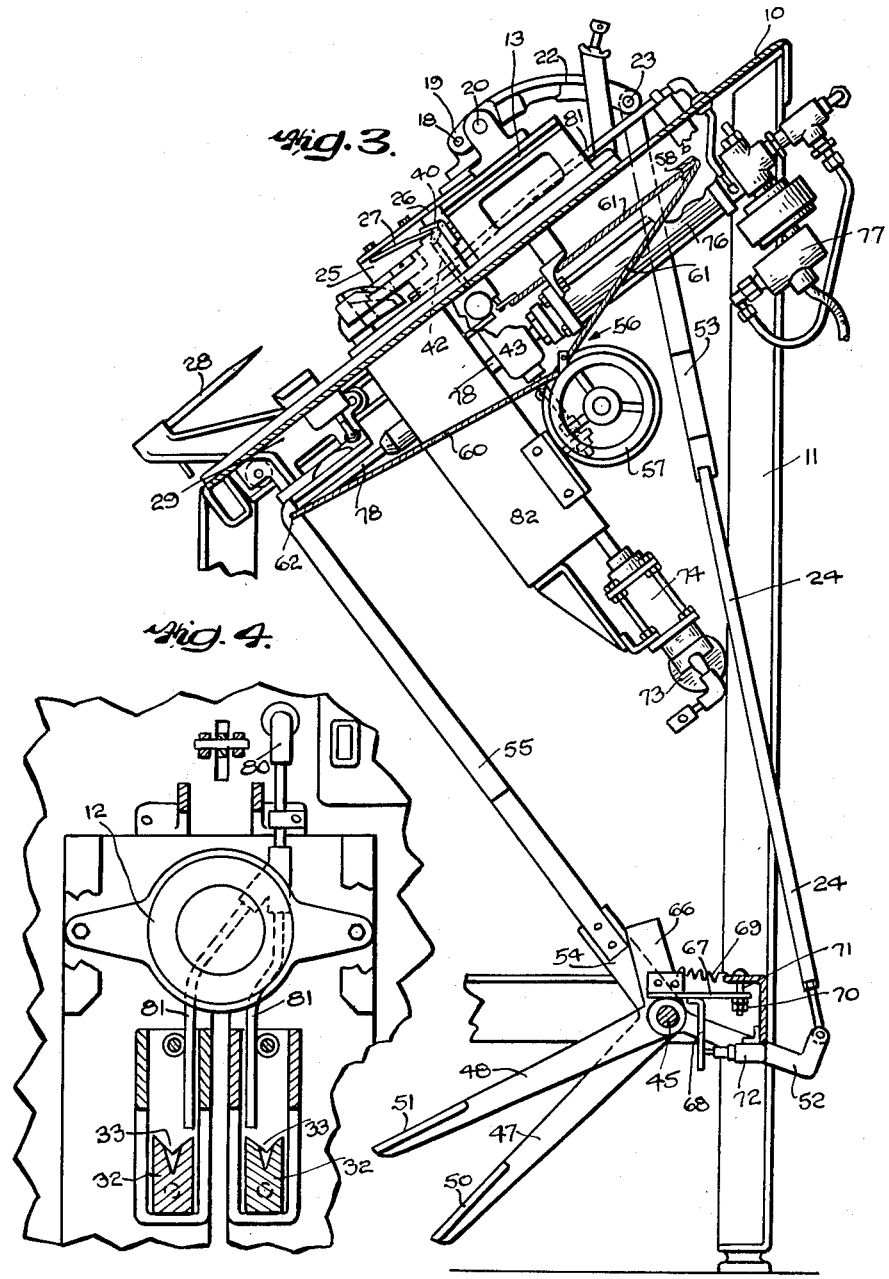

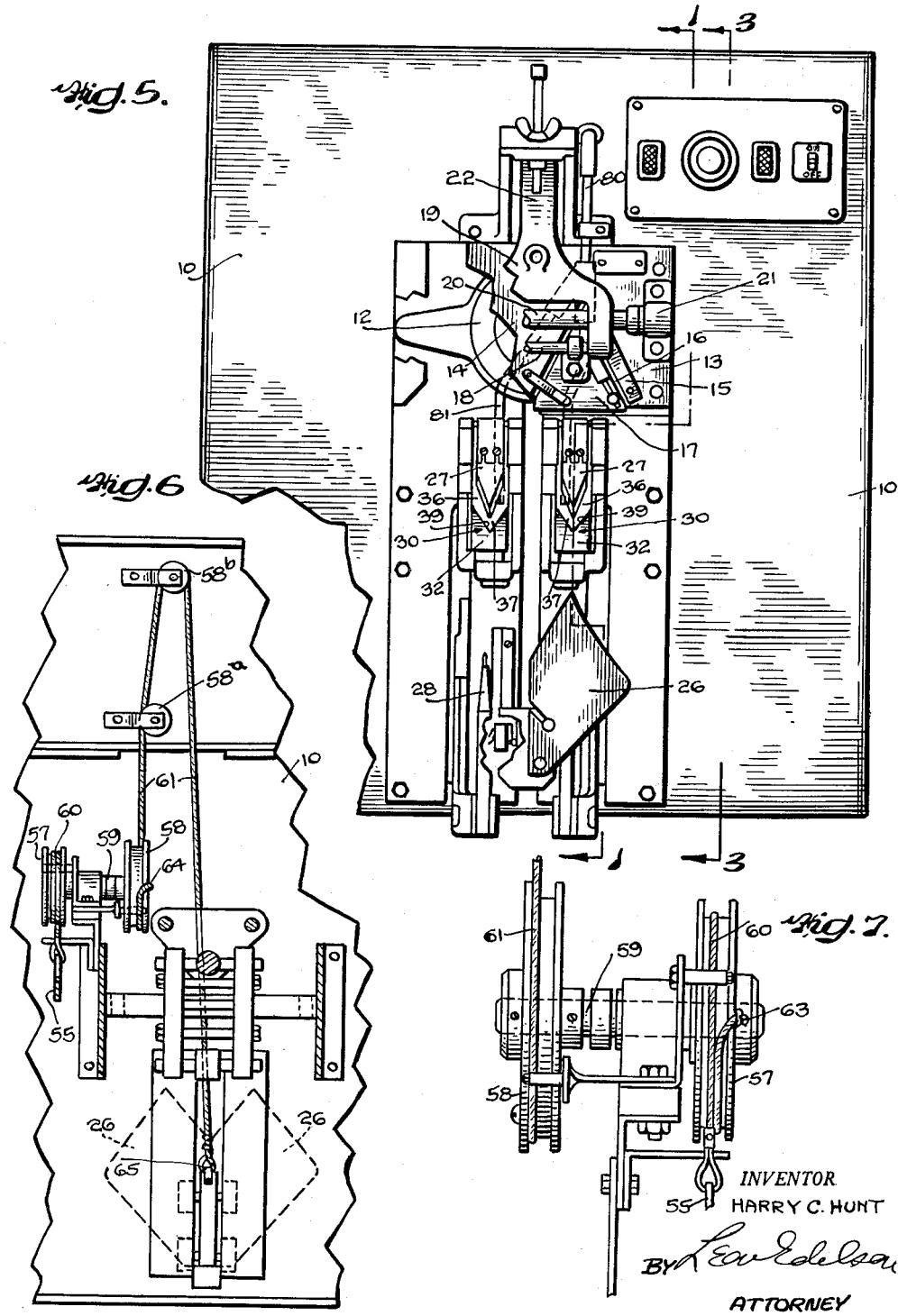

2,995,279
COLLAR TRIMMING AND SHAPING APPARATUS
Harry C. Hunt, Reading, Pa., assignor to American Safety Table Company, Inc., Reading, Pa., a corporation of Pennsylvania.
Filed Jan. 6, 1960, Ser. No. 825
9 Claims. (Cl. 223—2)

This invention relates generally to apparatus for shaping and pressing collars, cuffs, lapels and other such multi-ply parts of garments and particularly to such apparatus having provision for automatically trimming excess material from the infolded seamed portions of said garment parts preliminarily to the operation of forming and pressing the same to final shape. Such an apparatus is shown and described in United States Letters Patent No. 2,909,307, dated October 20, 1959, and the present invention relates specifically to certain improvements in the constructional and operational details of said patented apparatus.

Among the principal objects of the present invention is to provide means for effecting foot-pedal controlled operation of those mechanisms of the apparatus which are operative, respectively, to (1) trim the excess material and shift the points about which the trimmed parts are turned right side out preliminary to the shaping and pressing operations, (2) shift the turned parts while on their shaping forms into position to be pressed, and (3) operate the pressing head of the apparatus to press the trimmed and formed part to its final shape.

More specifically, it is an object of the present invention to achieve the aforesaid operations under foot-treadle control of the operator whereby the latter may at all times have full and complete control of the apparatus during the operation thereof.

Still another objective of the present invention is to provide fluid pressure operated means in conjunction with the foot-treadle operated means associated with the movable turning points of the apparatus for effecting retraction of such turning points under the influence of pneumatic pressure automatically upon release of said foot-treadle operated means.

Still another specific object of the invention is to provide fluid-pressure operated means on association with and under control of a foot treadle for not only advancing into pressing position the forming die upon which the part to be pressed has been fitted but also for retracting the forming die from the pressing head free of the part to be pressed.

By so effecting fluid-pressure operation of the turning points and the die blades of the apparatus through foot treadle means under control of the operator, the several operations of the apparatus are effected expeditiously, rapidly and with minimum effort and yet remain each under complete and safe control of the operator.

Still another and important object of the present invention is to provide in an apparatus of the character described blower means operative automatically to blow away from and free the trimming region of all material trimmed from the garment parts processed in the apparatus.

Other objects and advantages of the present invention will be apparent hereinafter, it being understood that the present invention consists substantially in the combination, construction, location and relative arrangement of parts, all as will be described more fully in the following detailed description, as shown in the accompanying drawings and as finally pointed out in the appended claims.

In the said accompanying drawings:

FIGURE 1 is a vertical sectional view of an apparatus constructed in accordance with and embodying the principles of the present invention, this view being taken along the line 1—1 of FIGURE 5;

FIGURE 2 is a rear elevational view of said apparatus;

FIGURE 3 is a fragmentary vertical sectional view of the apparatus showing the die blade shifted to place the work in position to be pressed, this view being taken along the line 3—3 of FIGURE 5;

FIGURE 4 is a horizontal section view of a portion of the apparatus as taken substantially along the line 4—4 of FIGURE 1;

FIGURE 5 is a top plan view of the apparatus;

FIGURE 6 is a transverse sectional view taken substantially along the line 6—6 of FIGURE 1; and FIGURE 7 is a top plan view of the cable and reel mechanism substantially as seen from the line 7—7 of FIGURE 1.

As described in the aforesaid United States Letters Patent No. 2,909,307, the disclosure of which is incorporated herein by reference, the apparatus of the present invention basically comprises a rigid support in the form of a table having an inclined table top 10 mounted upon four suitably braced legs 11, the table top being fitted with a plurality of suitably located thermostatically controlled heating units such as that designated 12.

Suitably mounted upon the table top 10 above the heating unit 12 is a base plate 13 upon which are mounted in overlying relation thereto a plurality of angularly related members 14 and 15 which define therebetween a pair of recesses 16—16 respectively adapted to receive therein the part to be pressed. These recesses are each of generally triangular shape and are arranged in side by side relation with their wide entrance portions facing toward the front of the machine.

Overlying the recesses aforesaid for respective accommodation therein are a pair of upper pressing members or shoes 17—17, which are adapted to be pressed downwardly into the recesses toward the base plate 13 for exerting pressing pressure upon the work positioned within the recess. These top pressure shoes 17—17, of which only the right hand one is shown in FIGURE 1, are pivotally supported upon a transversely extending shaft 18 secured to the forward end of an operating yoke or lever 19 which is in turn pivotally supported upon a second transversely extending shaft 20 suitably journalled at its opposite ends in bearing blocks 21 mounted upon the base plate. The rearwardly extending arm 22 of the operating yoke or lever 19 is pivotally connected, as at 23 (FIGURE 2), to an operating rod 24 by means of which the yoke may be rocked about its shaft 20 in one direction or the other to either depress the shoes 17—17 into work-pressing position or to raise the shoes out of pressing engagement with the work.

The apparatus to which the present invention relates also includes as primary components thereof a movable die blade carriage 25 fitted with a pair of laterally spaced die blades 26—26, of which only the right hand one is shown in FIGURE 5, which die blades are each adapted to be fitted with the work to be pressed and are respectively rectilinearly shiftable into the pressing head recesses 16—16 above mentioned.

Operatively associated with the shiftable die blades 26—26 just below the plane of movement thereof are two sets of turning points, one set for each die blade. Each set of these turning points includes a first turning point 27 which is relatively fixed against movement along the line of travel of its associated die blade and a second turning point 28 which is movable into and out of substantially point to point engagement with the first turning point. The relatively movable turning points 28—28 are commonly mounted in side by side parallel relation upon a shiftable carriage 29 and thus are simultaneously shiftable rectilinearly toward and away from their corresponding relatively fixed turning points along parallel lines which are coincident with the vertical planes of movement of the pointed extremities of the die blades.

Inasmuch as the construction and arrangement of the pressing head or die assembly, of the die blade and carriage assembly and of the movable turning points and carriage assembly above briefly referred to are all essentially the same as those shown and described in the above mentioned prior Patent No. 2,909,307, as well as in a previously issued patent to M. T. Voigt, No. 2,619,267, further detailed descriptions of these assemblies is deemed unnecessary, the disclosures of such patents being included herein by reference for such further detailed description of the said assemblies as may be desired.

As in the apparatus of Patent No. 2,909,307, the relatively fixed turning points 27—27 have operatively associated therewith a pair of laterally spaced trimming mechanisms, generally designated 30—30, each of which includes, inter alia, a vertically reciprocable trimming head 31 having a shear part 32 which is provided with a V-shaped recess, as at 33, to form a pair of downwardly inclined, relatively divergent cutting edges 34—34. Each of these trimming heads 31 is suitably secured to the uppermost end of an axially reciprocable operating rod 35 extending perpendicularly through the table top 10.

Coacting with each trimming head 31 is a shear blade 36 having a V-shaped nose part 37 which is complemental to and snugly fits in the V-shaped recess 33 of the reciprocable part 32. This shear blade 36 is suitably slidably mounted upon a fixed guide or support 38 secured to the table top 10, the said shear blade being constantly biased into the recess 33 of the shear part 32 by means of a compression spring 39. The bottom edges of the divergent sides of the nose part 37 of the shear blade 36 conjointly form cutting edges 39—39 which coact with the cutting edges 34—34 of the movable shear part 32 to trim excess material from the work to be pressed while the same is fitted on the relatively fixed turning point 27 and just prior to turning the same right side out, all as is fully described in the aforementioned Patent No. 2,909,307. While the turning points 27—27 are each restrained against shifting movement in the plane of movement of the shiftable turning points 28—28 and so are referred to herein as being fixed, the said turning points 27—27 are in fact capable of limited swinging movement relatively to the shear blades 36—36 which they respectively overlie, as see FIGURES 1, 3 and 5. To effect this limited swinging movement of the turning points 28—28, each is secured to a bellcrank lever arm 40, pivoted as at 41 upon shear blade support 38, which lever arm is in turn pivotally connected to an operating rod 42 projecting perpendicularly through the table top 10. These rods 42—42 are respectively normally biased downwardly relatively to the table top by means of a dash pot 43 housing a compression spring and thus resiliently maintain the turning points 27—27 in their downwardly depressed condition as shown in FIGURE 1.

The several mechanisms as hereinbefore described are sequentially operable, as described in the aforesaid Patent No. 2,909,307, to (1) trim the excess material from the pointed portion of the work to be pressed while said work is fitted upon the turning point 27 in its initial wrong side out condition; (2) turn the trimmed work right side out over and upon the turning point 28 when the latter has been shifted into substantially point to point engagement with the turning point 27; (3) to fit the turned work upon the die blade upon retraction of the turning point 28 toward its initial at-rest post; (4) to shift the die blade with the work to be pressed smoothly fitted thereon into the pressing head recess; and (5) to finally press the work to shape within the pressing head under heat and pressure, preferably after first releasing the pressure applied to the top pressure shoe sufficiently to permit withdrawal of the die blade from the work to be pressed and thereafter re-applying the top pressure shoe under full pressure to the work freed of its forming die blade.

In accordance with the principles and objectives of the present invention, the above mentioned operations are effected by the mechanisms now to be described, all under foot-pedal control of the operator. To this end, it will be observed that the table frame of the present apparatus is provided toward the bottom and at the rear thereof with a transversely extending shaft 45 upon which are mounted three independently pivoted foot treadles 46, 47 and 48 respectively having forwardly extending arms terminating in the foot pedals 49, 50 and 51. The treadle 46 is provided with a rearwardly extending arm 52 connected, through the intervention of the rigid linkage rod 24 and its extension 53, directly to the rearwardly extending arm 22 of the pressure-applying yoke or lever 19 which pivotally mounts the top pressure shoes 17—17 and thus pressing-pressure is imparted to and relieved from the shoes 17—17 by actuation of the foot-treadle 46.

The central treadle 47 is also provided with an angularly related arm 54 to which is secured a rigid extension 55 extending upwardly and forwardly of the transversely extending shaft 45, the upper end of which extension is connected to the shiftable die blade carriage 25 through a cable system designated generally by the numeral 56. This cable system 56 includes a pair of laterally spaced cable reels 57 and 58 (as best shown in FIGURES 2, 6 and 7) commonly keyed to a single shaft 59 suitably journalled beneath the table top 10 of the apparatus. The system also includes a pair of cables 60 and 61, the cable 60 being wound about the reel 57 with its opposite ends respectively connected to the foot-treadle extension 55, as at 62, and to the reel 57, as at 63. The second cable 61 is wound about the reel 58 and trained over the guide pulleys 58a and 58b with its opposite ends respectively connected to said reel as at 64, and to the die blade carriage 25, as at 65. It will be apparent that upon depression of the foot treadle 47, its vertical extension 55 will move away from the reel 57 and so effect rotation thereof as the cable 60 is withdrawn therefrom, resulting in corresponding rotation of the reel 58 with consequent winding up of the cable 61 upon the latter reel and movement of the die carriage 25 from its at-rest position shown in FIGURE 1 toward and into the pressing head of the apparatus, as shown in FIGURE 3. Upon release of the foot treadle 47, the weight of the die carriage movable along its inclined track, supplemented if desired by return coil springs (not shown), will cause the carriage to return to its initial at-rest position, thereby reversing the travel of the cables 60 and 61 about their respective sheaves 57 and 58. Upon such return travel of the die blade carriage 25, the cable 60 will wind up about the sheave 57 simultaneously as the cable 61 unwinds about the sheave 58. The necessity for employing a cable system as just described with its laterally spaced sheaves will be apparent hereinafter, it being noted at this point that the shifting of the die blade carriage is effected manually by foot-treadle manipulation under control of the operator.

The third and remaining treadle 48 is that which controls shifting of the movable turning point carriage 29 and operation of the trimming mechanisms 30—30. This treadle 48 is provided with an angularly related extension 66 to which is suitably secured a rearwardly extending motion-limiting arm 67 having a depending switch-actuating arm 68. A coil spring 69 normally biases the treadle 48 into raised position as shown in FIGURE 3, in which position the motion-limiting arm 67 is in engagement with the nut 70 secured to the lower end of a stop pin 71 to limit upward movement of the treadle 48 under the biasing influence of the spring 69. This stop pin 71 extends freely through the end of the motion-limiting arm and thus the latter is free to move relatively to the pin within the limits imposed by the lower stop nut 70 on the pin and the horizontally extending frame member which supports the pin, as best shown in FIGURE 3.

A micro-switch 72, engageable by the switch-actuating arm 68 of the foot-treadle 48 and thus adapted to be opened and closed by the latter, is suitably connected in electrical circuit with a solenoid valve 73 for controlling the operation of a double-acting fluid-pressure motor 74. This motor 74, which is preferably pneumatically operated, is connected by means of a linkage system 75 to the operating rods 35—35 of the movable shear parts 32—32 of the trimming mechanisms and to the rods 42—42 of the pivoted turning points 27—27, this linkage arrangement being substantially the same as that disclosed in the above mentioned Letters Patent No. 2,909,307.

The double-acting pneumatic motor 74 with its solenoid-controlled air valve may be of any type, a suitable unit for the purpose intended being such as is manufactured by the Bellows Company of Akron, Ohio (Bellows Air Motor, Model BEM-2, Bulletin 5P-60, page 2), its operation being such that upon energization of its controlling solenoid valve the piston thereof completes a full cycle of operation in which it initially moves upwardly to raise the recessed shear parts 36—36 into their extreme elevated position and simultaneously press the pivoted turning points 27—27 downwardly into overlying engagement with the fixed shear blades 36—36 and then moves downwardly relatively to the latter shear blades to trim the excess material from the work held in place upon and by that one of the turning points 27 which is in use at the moment. This operation is more particularly described in the aforesaid Letters Patent No. 2,909,307.

The same micro-switch 72 also controls operation of a second single-acting fluid-pressure motor 76 through a solenoid valve 77 connected in circuit with the solenoid valve 73, the motor 76 being operatively connected through its piston rod 78 to the movable carriage 29 mounting the rectilinearly shiftable turning points 28—28. The solenoid valves 73 and 77 are so sequentially timed (as by a time delay relay, not shown, or other suitable means) in their operation as to insure non-interfering operation of the trimmer mechanisms relatively to the movable turning points 28—28, which latter are shifted into collar turning position, i.e., into point to point contact with the relatively fixed turning points 27—27, just after the trimming operation has been effected.

The fluid-pressure motor 76 is of the single acting type as above mentioned and is operative upon energization of its controlling solenoid valve 73 to effect retraction of the piston rod 78 and consequent shifting of the turning points 28—28 on their commonly mounted carriage 29 toward the upper turning points 27—27, during which retractive movement of the piston rod 78 the piston of the motor 76 forces air out of its exhaust port, as at 79, into and through an air conduit 80 having a pair of branches 81—81 which respectively lead to the immediate regions wherein the work is trimmed of excess material. Thus, as most clearly shown in FIGURE 4, the open ends of these air conduits 81—81 each extend forwardly beneath the trimmer mechanism shear blade 36 to a point in close proximity to the V-shaped recess 33 of the movable shear part 32 so that upon operation of each trimming mechanism the trimmed excess material is blown away from and out of the trimming region by air pressure supplied by the cylinder of the motor 76.

Air is jetted from the discharge ends of the conduits 81—81 automatically upon and during each fluid-pressure-actuated stroke of the piston rod 78 of the fluid pressure motor 76, that is, during the interval of travel of the shiftable turning points 28—28 toward their corresponding relatively fixed turning points 27—27 and thus all excess material trimmed from the work preliminarily to the turning operation is completely removed from the work trimming and turning region prior to actual turning of the work and the fitting thereof upon the shaping blades 26—26 which carry the work into the pressing head for pressing to final shape under heat and pressure. It will be noted that the discharge ends of the air conduits 81—81 are respectively disposed to the inner sides of the trimming mechanism and preferably the conduit ends are designed to eject air under pressure laterally across and toward the outer sides of the recessed portions of the movable shear parts 32—32 so that the excess material is blown outwardly to either side of the apparatus to thereby maintain free of debris not only the trimmer mechanisms but also the underlying trackways upon which the die blade and turning point carriages are shiftable.

For operation of the machine of the present invention, it will be understood that initially and upon closing the main switch of its electrical control circuit (not shown), the several operating mechanisms thereof will be in their at rest conditions as shown in FIGURE 1, in which case of course all three of the foot-treadles 46, 47 and 48 will be in their raised positions as shown, the treadles 46 and 48, like the treadle 47, being normally so held in their inoperative positions by suitable coil springs (not shown). In this initial starting condition of the apparatus, electrical resistance elements which heat the pressing head will be energized, the top pressure shoes will be raised into their elevated non-pressing position, the shiftable die blades and turning points will be in their lower at-rest positions, the movable shear parts will be in their downmost position and the swingable turning points will be raised, all as shown in FIGURE 1. Also, the solenoid valves 73 and 77 for controlling operation of the fluid-pressure motors 74 and 76 will be in their deenergized condition.

With the machine in the condition as just described and upon fitting a collar or other such garment part wrong side out upon the raised turning point 27, the foot treadle 48 is depressed to close the micro-switch 72 and thereupon sequentially energize the solenoid valves 73 and 77 as above described, the garment part will be clamped firmly in position between the turning point 27 and its associated shear blade 36 and will be trimmed of excess material in the immediate region of the turning point. Simultaneously the shiftable turning point 28 will advance toward the part being trimmed and will make point to point contact with the work-fitted turning point 27 just after completion of the trimming operation. Also, during the downward trimming stroke of the shear part 32 and while the turning point 28 is advancing toward the work being trimmed, air under pressure will be delivered to the trimming regions by way of the air conduits 80, 81—81.

Upon completion of the trimming operation, and while the turning points 27 and 28 hold the trimmed work part therebetween, the said part is manually turned right side, being thus transferred in effect from the turning point 27 onto the turning point 28, whereupon the treadle 48 is released to thereby open the micro-switch 72 and effect deenergization of the solenoid valves 73 and 77, resulting in return of the turning points 27—27 to their initial at rest position, during which return movement the garment part in its right side out condition is slipped over and upon that die blade 26 which immediately overlies the returning point about which the part was turned. The return movement of the turning points 27—27 is preferably effected through the influence of gravity pull upon the turning point carriage 29 which travels upon an inclined track, although if desired such return movement may be assisted by use of a suitable return spring (not shown) suitably coupled to the carriage 29 or incorporated in the motor 76 for biasing its piston rod 78 outwardly of its cylinder.

Thereupon the die blade carriage 25, with the garment smoothly fitted over one of the die blades 26—26, is advanced by operation of the foot treadle 47 and its associated cable system hereinbefore described into the pressing head for the final pressing operation. Finally, the foot treadle 46 is depressed to apply pressing pressure to the work thus advanced by the die blade into the pressing head, it being a preferred practice to initially actuate the foot treadle just sufficiently to cause the top pressure to lightly engage and hold the work in position as the die blade is retracted therefrom upon release of the treadle 47, following which full pressure is applied to the treadle 46 for final pressing of the garment part to shape.

It will be noted that all of the operations above described are initiated by actuation of foot-treadles under direct control of the operator, and thus the machine of the present invention with its automatic trimming mechanism may be operated with the same skill and dexterity and with the same degree of safety and speed as with the well-known foot-pedal operated double-point collar forming and pressing machines of the type shown and described in Patent No. 2,619,267 hereinbefore referred to.

It will be noted that the cable system above described for effecting shifting movement of the die blade carriage upon actuation and release of the foot treadle 47 is of such construction and design as to provide adequate clearance and operating space beneath the table top 10 for the fluid pressure motor 74 and its associated linkages to the trimming mechanisms and the upper turning points 27—27. In this connection it will be observed that the upwardly extending lever arm 55 of the foot treadle 47 is laterally bent for disposition well to one side of the motor 74 and its supporting frame 82 depending from the table top 10 and that the axially spaced sheaves 57—58 of the cable system straddle one side leg of the motor supporting frame so that while the cable 60 and its sheave 57 are disposed to the outer side of the motor frame 82, the cable 61 and its sheave 58 are disposed centrally of the machine for most effective and efficient direct pull upon the die blade carriage. It will be noted, also, that the upper extension 53 of the linkage rod 24, interconnecting the pressure-applying foot treadle 46 to the upper shoe pressure-applying yoke 19, is bent, as shown in FIGURE 2, in lateral offset relation to the fluid-pressure motor 77 so as to be free to move without interference by said motor and its supporting frame in response to pressure-applying movement of the foot treadle 46.

It will be understood that the present invention is susceptible of various changes and modifications which may be made from time to time without departing from the general principles or real spirit of the invention, and that accordingly it is intended to claim the same broadly, as well as specifically, as indicated by the appended claims.

What is claimed as new and useful is:

1. Apparatus for trimming collars to be subsequently shaped and pressed comprising, collar turning means including a stationary elongated collar turning member, a shiftable elongated collar turning member disposed in spaced end to end relation to said stationary collar turning member, means mounting said shiftable collar turning member for rectilinear shifting movement back and forth between a position remote from said stationary collar turning member and a position proximate the same, a collar trimming mechanism including a stationary trimmer member and a coacting reciprocable trimmer member, means for actuating said reciprocable trimmer member and said shiftable collar turning member in predetermined timed relation to first trim a collar held in trimming position on said stationary turning member and to then shift said shiftable turning member from its remote to its proximate position relative to said stationary turning member, and means for automatically removing the trimmed off portions of the collar from the region of the trimming mechanism during the time interval during which said shiftable collar turning member is being shifted from its remote to its proximate position relative to said stationary turning member to prevent eventual clogging of the trimming mechanism with trimmings.

2. Apparatus for trimming collars to be subsequently shaped and pressed comprising, collar turning means including a stationary elongated collar turning member, a shiftable elongated collar turning member disposed in spaced end to end relation to said stationary collar turning member, means mounting said shiftable collar turning member for rectilinear shifting movement back and forth between a position remote from said stationary collar turning member and a position proximate the same, a collar trimming mechanism including a stationary trimmer member and a coacting reciprocable trimmer member, means for actuating said reciprocable trimmer member and said shiftable collar turning member in predetermined timed relation to first trim a collar held in trimming position on said stationary turning member and to then shift said shiftable turning member from its remote to its proximate position relative to said stationary turning member, and means actuated by the means for shifting said shiftable collar turning member effective for automatically removing the trimmed off portions of the collar from the region of the trimming mechanism to prevent eventual clogging of the latter with trimmings.

3. Apparatus for trimming collars to be subsequently shaped and pressed comprising, collar turning means including a stationary elongated collar turning member, a shiftable elongated collar turning member disposed in spaced end to end relation to said stationary collar turning member, means mounting said shiftable collar turning member for rectilinear shifting movement back and forth between a position remote from said stationary collar turning member and a position proximate the same, a collar trimming mechanism including a stationary trimmer member and a coacting reciprocable trimmer member, means for actuating said reciprocable trimmer member and said shiftable collar turning member in predetermined timed relation to first trim a collar held in trimming position on said stationary turning member and to then shift said shiftable turning member from its remote to its proximate position relative to said stationary turning member, and means for automatically removing the trimmed off portions of the collar from the region of the trimming mechanism to prevent eventual clogging of the latter with trimmings, said last named means being actuated by the means for shifting said shiftable collar turning member only during the time interval during which said shiftable collar turning member is being shifted from its remote to its proximate position relative to said stationary turning member.

4. Apparatus for trimming collars to be subsequently shaped and pressed comprising, collar turning means including a stationary elongated collar turning member, a shiftable elongated collar turning member disposed in spaced end to end relation to said stationary collar turning member, means mounting said shiftable collar turning member for rectilinear shifting movement back and forth between a position remote from said stationary collar turning member and a position proximate the same, a collar trimming mechanism including a stationary trimmer member and a coacting reciprocable trimmer member, means for actuating said reciprocable trimmer member and said shiftable collar turning member in predetermined timed relation to first trim a collar held in trimming position on said stationary turning member and to then shift said shiftable turning member from its remote to its proximate position relative to said stationary turning member, and means for automatically removing the trimmed off portions of the collar from the region of the trimming mechanism to prevent eventual clogging of the latter with trimmings, said means for actuating said shiftable collar turning member comprising a fluid pressure motor including a cylinder and piston shiftable therewithin under pneumatic pressure, said shiftable collar turning member being coupled to said piston and shiftable therewith, and said means for automatically removing collar trimmings from the trimming mechanism being coupled to the cylinder of said fluid pressure motor and actuated by pneumatic pressure therefrom when said piston is shifted therewithin.

5. Apparatus for trimming collars to be subsequently shaped and pressed comprising, collar turning means including a stationary elongated collar turning member, a shiftable elongated collar turning member disposed in spaced end to end relation to said stationary collar turning member, means mounting said shiftable collar turning member for rectilinear shifting movement back and forth between a position remote from said stationary collar turning member and a position proximate the same, a collar trimming mechanism including a stationary trimmer member and a coacting reciprocable trimmer member, means for actuating said reciprocable trimmer member and said shiftable collar turning member in predetermined timed relation to first trim a collar held in trimming position on said stationary turning member and to then shift said shiftable turning member from its remote to its proximate position relative to said stationary turning member, and means for automatically removing the trimmed off portions of the collar from the region of the trimming mechanism to prevent eventual clogging of the latter with trimmings, said means for actuating said shiftable collar turning member comprising a fluid pressure motor including a cylinder and piston shiftable therewithin under pneumatic pressure, said shiftable collar turning member being coupled to said piston and shiftable therewith, and said means for automatically removing collar trimmings from the trimming mechanism being coupled to the cylinder of said fluid pressure motor and actuated by pneumatic pressure therefrom when said piston is shifted therewithin to move said shiftable collar turning member from its remote to its proximate position relative to said stationary turning member.

6. The apparatus according to claim 4 wherein said means for automatically removing collar trimmings from the trimming mechanism comprises an air conduit system connected at one end to the cylinder of said fluid pressure motor and extending therefrom to the region of coaction of said stationary and reciprocable trimmer mechanisms members and open-endedly terminating thereat, whereby pressurized air is expelled from the open end of said conduit system to blow away the trimmed material as the shiftable collar turning member approaches the stationary turning member.

7. The apparatus according to claim 6 wherein said shiftable collar turning member shifts back and forth upon a trackway which at least partially underlies the said trimming mechanism, the open end of said air conduit system being so located relative to said trackway and trimming mechanism that air issuing therefrom not only blows the collar trimmings out of the trimming mechanism but also maintains the trackway free of such trimmings.

8. In combination, a presser head including a fixed base member and a relatively movable member overlying said base member, a die member adapted for receiving and shaping a collar to be pressed, means mounting said die member in a plane extending between said fixed and movable presser head members, and means for rectilinearly shifting said mounting means in said plane back and forth between a position remote from said presser head and a position within said presser head, said shifting means comprising an intercoupled dual cable system one cable of which is connected at one end to said die member mounting means and connected at its other end to means for intercoupling the cables of said dual cable system, the second cable of said cable system being connected at one end to said cable intercoupling means and connected at its other end to a foot operated treadle, whereby when said treadle is depressed said second cable operates through said intercoupling means to cause said one cable to shift said die member toward said presser head.

9. The combination according to claim 8 wherein said cable intercoupling means comprises a pair of laterally spaced cable reels keyed upon a common rotatable shaft, the end of said one cable connected to said intercoupling means being secured to and wound in a first sense about one of said reels, and the end of said second cable connected to said intercoupling means being secured to and wound about the other of said reels in opposite sense to the winding sense of said one cable.

References Cited in the file of this patent
UNITED STATES PATENTS

| | | |
|---|---|---|
| 2,446,261 | Christensen et al. | Aug. 3, 1948 |
| 2,909,307 | Hunt et al. | Oct. 20, 1959 |